Figure 1:
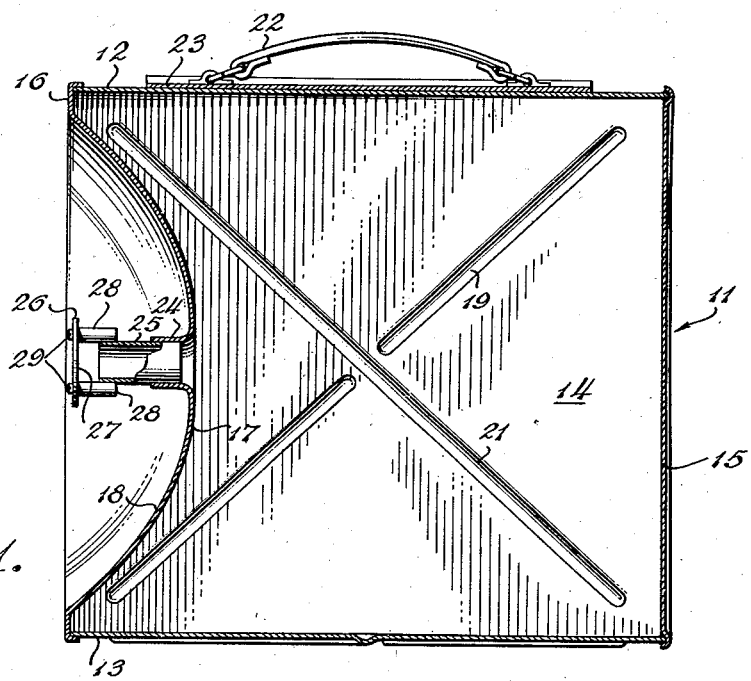

Jan. 6, 1948.  S. SENSIPER  2,433,868

RADAR TEST APPARATUS

Filed Aug. 18, 1943

INVENTOR
SAMUEL SENSIPER
BY Paul B. Hunter
ATTORNEY

Patented Jan. 6, 1948

2,433,868

UNITED STATES PATENT OFFICE 2,433,868

RADAR TEST APPARATUS

Samuel Sensiper, Garden City, N. Y., assignor to Sperry Gyroscope Company, Inc., a corporation of New York Application August 18, 1943, Serial No. 499,083

10 Claims. (Cl. 250—1.62)

This invention relates to ultra high frequency apparatus and particularly to microwave test apparatus.

Object detecting and locating systems have been developed wherein pulse waves of ultra high frequency electro-magnetic energy are launched into space from a transmitter and, after reflection from a distant object or objects, are picked up and utilized by a suitable indicating receiver nearby the transmitter. Because of the large distances involved and possibility of interference from foreign objects, it is difficult to quickly test such devices under working conditions. The great speed of the pulse waves also renders testing by reflection from nearby objects almost impossible. The present invention is concerned with a test device which can be reliably employed near the transmitter and receiver to be tested, for simulating testing over a considerable working distance.

A heretofore proposed device of this type comprises a hollow chamber adapted to receive the transmitted pulses so as to be excited thereby, and to then reradiate pulses of ultra high frequency energy toward the receiver in such time delay relative to the exciting pulses as to simulate travel of the pulse energy over a relatively great distance. Several forms of this proposed device are disclosed and claimed in Serial No. 450,226 filed July 8, 1942, and the present invention is an improvement over the device disclosed in that application.

As was pointed out in patent application Serial No. 450,226, the hollow chamber for receiving ultra high frequency energy and then reradiating this energy may comprise a box having dimensions of the order of several wavelengths, for example, having dimensions of the order of six wavelengths. Chambers of this order of size are adapted to be energized by very brief pulses of ultra high frequency electromagnetic energy, and to reradiate this energy with a substantially logarithmic time-decay of reradiated signal strength over an appreciable time interval, as over the interval between successive pulses transmitted by the radio object detecting and locating system being tested.

It is a major object of the invention to provide a hollow chamber test device of novel construction for use in testing pulse transmitting and receiving systems and the like.

A further object of the invention is to provide a novel, simple, compact, portable and practical hollow chamber test device for use in testing pulse transmitting and receiving systems and the like.

A further object of the invention is to provide a novel hollow chamber test device wherein the electromagnetic wave energy directing elements are located substantially within a circumscribed envelope having a pattern determined mainly by the chamber walls.

A further object of the invention is to provide a novel hollow chamber test device provided with a dished electromagnetic wave energy reflector, preferably parabolic, and wherein the reflector forms at least part of one wall of the resonator.

Figure 2:
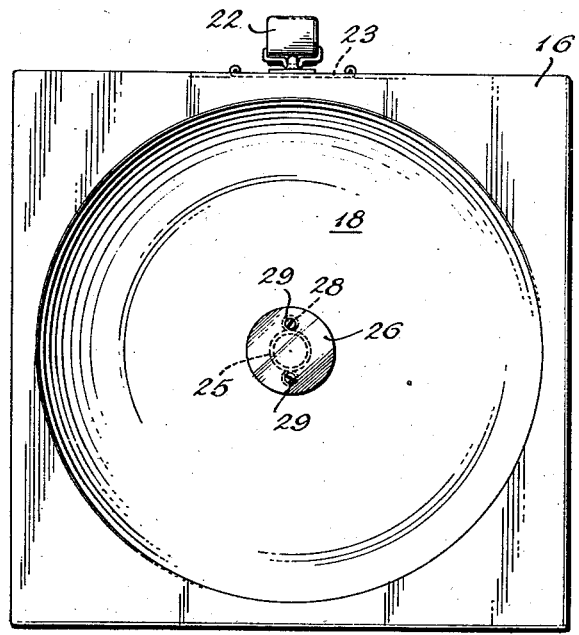

Further objects of the invention will presently appear as the description proceeds in connection with the appended claims and the annexed drawings wherein:

Fig. 1 is a side elevation, partly in section, of a hollow resonator test device according to the invention; and Fig. 2 is a front elevation of the device of Fig. 1.

The invention comprises a hollow conductive generally cubical box 11 having flat parallel top and bottom walls 12 and 13, flat parallel side walls 14 (only one shown), a flat rear wall 15, and a front wall 16 having its major and central portion 17 dished inwardly. The front face of front wall portion 17 is formed as a paraboloidal reflector 18 facing outwardly of box 11. Walls 14–17 interiorly define an enclosed chamber adapted, when excited by high frequency energy, to contain an oscillatory electromagnetic field. The shape of the chamber is preferably such that the oscillating field may be produced at a plurality of exciting different frequencies, and the amplitude of standing waves within the chamber is substantially the same for all of them This type of chamber is sometimes referred to as an untuned chamber or cavity.

All of the walls of box 11 bounding the chamber are of copper or some other highly electrically conductive material, and may be formed integrally or in separate pieces as desired. Preferably, the seams or joints between the walls are smooth and sealed as by welding or soldering.

Each of the flat walls is integrally formed with diagonal reinforcing ribs such as 19 and 21 for resisting accidental deformation and buckling. The box is manually carried in the field by means of a strap handle 22 secured at opposite ends to upstanding lugs rigid with a flat metal plate 23, secured as by riveting upon the top side of wall 12. Plate 23 reinforces wall 12 against buckling when the box is carried by handle 22.

The central region of wall portion 17 is apertured and formed with a forwardly extending tubular boss 24 of relatively small diameter. A short tube 25, functioning as an electromagnetic wave guide, as will be explained, is rigidly secured to boss 24. A plate 26 having a diameter slightly greater than tube 25, and having a flat reflector face 27 opposite the open mouth of tube 25, is rigidly mounted on tube 25, as by supports 28. Supports 28 may be conductive or dielectric members rigidly secured to tube 25, and plate 26 is removably secured thereto as by screws 29. If desired, tube 25 may be an integral extension of boss 24, and is preferably circular in cross-section, so that no especial precautions need be taken in locating the box before the transmitter. If wave guide 25 is chosen as rectangular in cross-section, for example, care must be taken to locate the box before the transmitter with the wave guide positioned in accord with polarization of the transmitted energy.

As shown in Fig. 1, reflector 18 and reflector plate 26 are located wholly inwardly of the vertical plane of wall 16, so as to be substantially wholly within the circumscribed external cubical envelope defined mainly by the box walls. This arrangement protects these parts against accidental injury, and provides a simple compact, symmetrical device which is readily portable and has no projecting parts.

In operation and use, the device is placed a convenient short distance in front of the pulse transmitter of an object detection and location system under test. Each transmitted pulse is collected by reflector 18, and directed onto reflector 27 which is preferably at the focus of reflector 18. Reflector 27 redirects the pulse energy through wave guide 25 into the interior of box 11.

The incoming pulse energy excites an oscillatory electromagnetic field within box 11. The generally cubical internal shape and the dimensions of box or chamber 11 are such as to produce the simultaneous existence of a plurality of different modes or frequencies of oscillation within the box, as above explained. The oscillations within box 11 build up during existence of the exciting pulse, and then start to decay at the end of the exciting pulse, because the device then begins to reradiate ultra high frequency energy toward the receiver of the object detection and location system under test.

The period of decay and reradiation is usually relatively long as compared to the pulse duration, but is accomplished in the interval between pulses so as to suitably render the resonator quiescent and ready for excitation by a new pulse.

The receiver of the object detecting and locating system responds to the reradiated energy for test purposes. The reradiated energy contains frequencies within the ability of the receiver to utilize. For further explanation of accepted theories of operation of this untuned type of test device, and descriptions of use of such test devices, see said Serial No. 450,226, wherein the same is described in detail.

It has heretofore been found necessary to accurately dimension cubical and similar regularly shaped hollow chambers to avoid degeneration of modes of oscillation and insure the presence of the large number of oscillation frequencies required for proper operation. I have found that the effect of the dished wall 17 in modifying the chamber shape in my invention is electrically such as to insure production of a larger number of oscillation frequencies of the standing field chamber than would be available within a truly cubical box, so that less accuracy is needed in dimensioning the box of the invention to avoid mode degeneration.

My test device is simple, externally symmetrical, inexpensive, readily portable and protected against accidental deformation. It employs fewer parts and less metal than previously known devices of the type, and there are no projecting parts to become entangled with wires or be knocked off accidentally. While the invention is described as employed with test devices having a chamber adapted to contain an oscillating field over a wide range of frequencies, it is equally well applicable to simplifying construction of test devices of the type illustrated in said Serial No. 450,226, having resonator chambers resonant at only a single frequency.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A test device for ultra high frequency pulse utilization systems and the like comprising wall means defining and substantially enclosing a chamber adapted to contain an oscillating electromagnetic field, an electromagnetic wave energy directing reflector defining a focal region and comprising the external face of an inwardly dished portion of said wall means, said dished wall portion being provided with an aperture opening to said chamber, and electromagnetic wave energy directing means coupled to said chamber through said aperture, said electromagnetic wave energy directing means comprising an energy conduit extending outward substantially to the focal region of said reflector and an energy director fixedly positioned at said focal region and directed toward the reflector and coupled to said conduit in energy interchanging relation therewith.

2. The test device described in claim 1, wherein said reflector and said electromagnetic wave energy directing means are disposed substantially wholly inwardly of an external envelope containing and chiefly defined by said wall means so as not to project outwardly of said device.

3. The test device defined in claim 1, wherein said reflector is arcuate, and said aperture is at the axis of said reflector.

4. A test device as defined in claim 1, wherein said reflector is a paraboloid having its latus rectum plane substantially coincident with its circular extremity.

5. The test device defined in claim 1, wherein said electromagnetic wave energy director comprises a small reflector mounted substantially at the focus of said first reflector and facing said aperture, and both said reflectors are disposed inwardly of the envelope defined by said other walls.

6. A test device for ultra high frequency pulse utilization systems and the like, comprising a plurality of conductive walls each having dimensions of several wavelengths at the frequency of pulse utilization systems to be tested defining and enclosing a chamber adapted to contain an electromagnetic field, a reflector comprising the external face of an outwardly concave portion of one of said walls, said wall portion being apertured at the reflector axis, a wave guide mounted in said aperture, and a second reflector mounted on said wave guide in spaced relation to the outer end thereof, said reflectors and wave guide being arranged to directively control received and reradiated energy between said chamber and external space.

7. The test device defined in claim 6, wherein said reflectors and said wave guide are located wholly inwardly of the plane of the wall on which they are mounted.

8. Radar test apparatus for directionally receiving very short pulses of ultra high frequency energy transmitted thereto from a radar transmitter and for directionally reradiating to the radar receiver extended ultra high frequency pulses characterized by a predetermined logarithmic decay of intensity of the reradiated pulse energy with time after reception of each transmitted pulse, comprising a hollow box having a first conductive wall dished to present a concave energy-reflecting surface exterior of said box and also having further conductive walls adjoining said first wall and providing a conductive enclosure having dimensions of several wavelengths at the frequency of said ultra high frequency energy, said concave surface having an opening therethrough for the passage of electromagnetic wave energy, a wave guide extending from said opening exteriorly of said enclosure, and a reflector positioned at the end of said wave guide opposite said opening and cooperating with said wave guide and said concave surface for the directive reception of energy from said radar transmitter and for the directive reradiation of energy to said radar receiver.

9. Radar test apparatus for directionally receiving very brief pulses of ultra high frequency energy of a predetermined wavelength transmitted thereto from a radar transmitter and for directionally reradiating to the radar receiver extended ultra high frequency pulses characterized by a predetermined logarithmic decay of intensity of the reradiated pulse energy with time after reception of each transmitted pulse, comprising a hollow box having a plurality of conductive walls, one of said conductive walls being dished to present a substantially paraboloidal concave energy-reflecting surface exterior of said box, said concave surface having an opening therethrough substantially at the axis of said paraboloidal surface for passage of electromagnetic wave energy into and out of said hollow box, a wave guide extending from said opening substantially along the axis of said paraboloidal surface for guiding the energy between said opening and the focal region of said surface, and a reflector positioned substantially at the focal region of said paraboloidal surface and cooperating with said wave guide and said paraboloidal surface for the directive reception of energy from said radar transmitter and the directive reradiation to said receiver of energy emerging from said box.

10. A test device for ultra high frequency pulse utilization systems and the like comprising wall means defining and substantially enclosing a chamber adapted to contain an oscillating electromagnetic field, an electromagnetic wave energy directing reflector comprising the external face of an inwardly dished portion of said wall means, said dished wall portion being provided with an aperture opening to said chamber, and electromagnetic wave energy directing means coupled to said chamber through said aperture and in operative association with said reflector for transmitting energy between said chamber and external space, said electromagnetic wave energy direction means comprising a hollow wave guide mounted in said aperture and a second reflector mounted on said wall means in spaced relation to the outer end of said wave guide and facing said first reflector.

SAMUEL SENSIPER.

REFERENCES CITED

The following references are of record in the file of this patent:

UNITED STATES PATENTS

| Number | Name | Date |
|---|---|---|
| 2,206,923 | Southworth | July 9, 1940 |
| 2,243,426 | Kircher | May 27, 1941 |
| 2,261,130 | Applegate | Nov. 4, 1941 |
| 2,337,184 | Carter | Dec. 21, 1943 |

Certificate of Correction

Patent No. 2,433,868.

January 6, 1948.

SAMUEL SENSIPER

It is hereby certified that error appears in the printed specification of the above numbered patent requiring correction as follows: Column 3, line 64, before the word "chamber" insert *within the*; and that the said Letters Patent should be read with this correction therein that the same may conform to the record of the case in the Patent Office.

Signed and sealed this 27th day of April, A. D. 1948.

[SEAL]

THOMAS F. MURPHY,
*Assistant Commissioner of Patents.*